United States Patent [19]

Nash

[11] 4,285,194
[45] Aug. 25, 1981

[54] APPARATUS AND METHOD FOR CONTROLLING FAN DUCT FLOW IN A GAS TURBINE ENGINE

[75] Inventor: Dudley O. Nash, Forest Park, Ohio

[73] Assignee: General Electric Company, Cincinnati, Ohio

[21] Appl. No.: 32,329

[22] Filed: Apr. 23, 1979

[51] Int. Cl.³ .............................. F02K 3/06; F02K 3/08
[52] U.S. Cl. ............................................ 60/261; 60/262
[58] Field of Search ............................ 60/204, 261, 262

[56] References Cited

U.S. PATENT DOCUMENTS

| 3,118,276 | 1/1964 | Keenan | 60/262 |
| 3,150,484 | 9/1964 | Oldfield | 60/261 |
| 3,595,024 | 7/1971 | Kohler | 60/261 |
| 4,064,692 | 12/1977 | Johnson | 60/262 |
| 4,072,008 | 2/1978 | Kenworthy | 60/262 |

FOREIGN PATENT DOCUMENTS 871016  6/1961  United Kingdom ...................... 60/262

*Primary Examiner*—Douglas Hart
*Attorney, Agent, or Firm*—Donald W. Walk; Derek P. Lawrence

[57] ABSTRACT

A fan duct flow control method and apparatus is provided for controlling fan bypass airflow at an inlet into an exhaust duct cooling annulus of a variable cycle gas turbine engine. The flow control employs a translating ring as a valve-like device that interacts with an annular lip on an inlet into the exhaust duct cooling annulus. The translating ring is positioned to restrict airflow into the liner during appropriate periods in engine operation. This flow control is uniquely constructed to be conveniently operated by a variable cycle engine actuation system that injects fan bypass air into an engine exhaust duct. The method and apparatus in one form is also used to block fan duct flow and reduce forward thrust during aircraft taxi operations.

3 Claims, 5 Drawing Figures

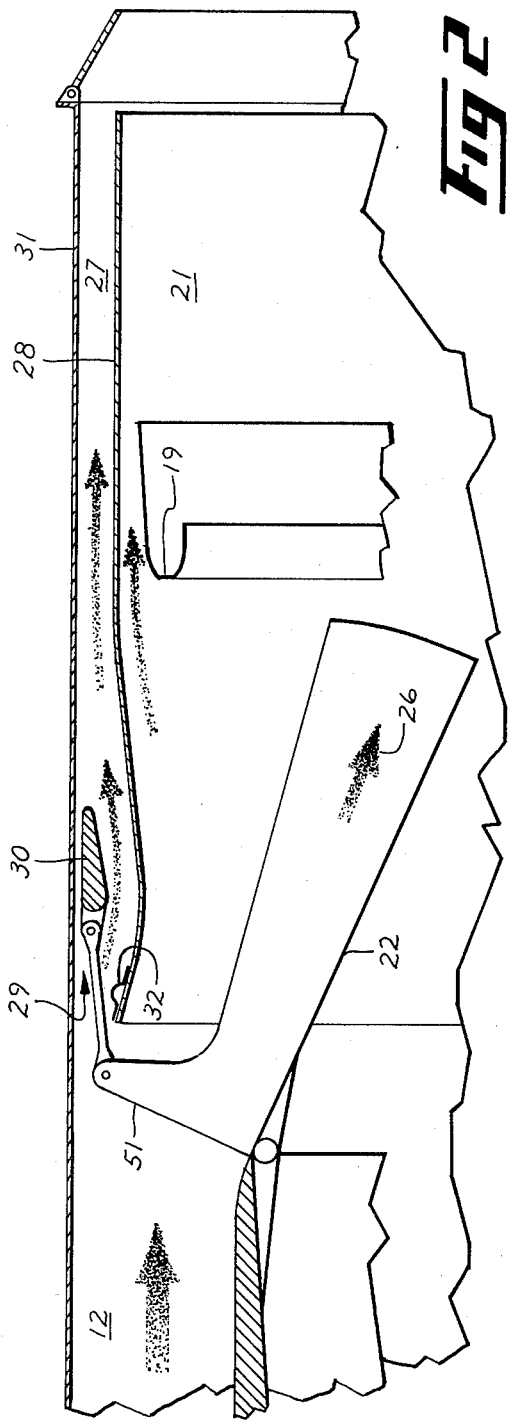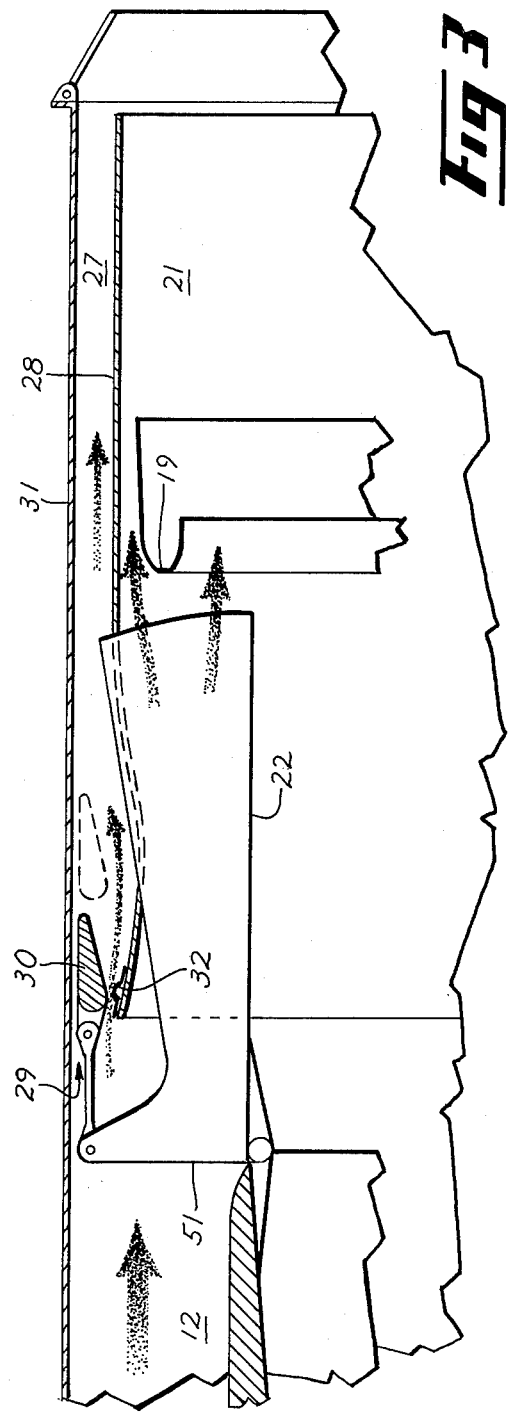

APPARATUS AND METHOD FOR CONTROLLING FAN DUCT FLOW IN A GAS TURBINE ENGINE

CROSS REFERENCE TO A RELATED APPLICATION

This application relates to a simultaneously filed patent application entitled, "Actuation System for Use on a Gas Turbine Engine,"—Dudley O. Nash and Thomas S. Clayton, is assigned to the same assignee, and discloses some subject matter common to the present application.

BACKGROUND OF THE INVENTION

1. Field of the Invention

This invention relates to thrust reduction and flow control apparatus and methods in exhaust nozzle liner regions of gas turbine engines.

2. Description of the Prior Art

Since the 1950's, jet aircraft engine manufacturers have expended considerable effort toward developing variable cycle engines. One of the reasons for this effort and a key feature contributing to the high performance of a variable cycle turbojet engine, is its capability of maintaining inlet airflow as thrust is reduced. This feature leads to important performance advantages under less than maximum thrust conditions, such as during subsonic cruise. The effect of maintaining inlet airflow, as thrust is reduced, is to decrease such performance penalties as inlet spillage drag and afterbody closure drag, both of which have considerable effect.

Certain variable cycle engines, such as that described in U.S. Pat. No. 4,068,471, assigned to the same assignee as the present invention, achieve relatively constant airflow as thrust is varied by changing the amount of fan bypass flow with a valve system referred to as a variable area bypass injector (VABI). As engine thrust is decreased, this valve system (VABI) increases bypass flow to offset decreasing core engine flow resulting in a relatively constant total engine flow.

While the variable cycle engine attains performance increases by maintaining constant inlet flow while varying thrust, special considerations are encountered when an afterburner-type thrust augmentor is used. When thrust augmentation is employed on a conventional turbofan engine, greater thrust levels can be achieved by combining and mixing the bypass flow and core flow upstream of the augmentor burner. In the case of a variable cycle engine with variable bypass duct flow, a variable area injecting and mixing device (rear VABI) is used at the augmentor upstream of the engine exhaust nozzle. This rear VABI is required so that pressures and velocities are matched and orderly flow conditions established as the varying bypass flow is combined with the core flow for heating in the augmentor prior to being accelerated by the exhaust nozzle.

In the operation of a variable cycle engine with its bypass duct valving, conditions are encountered at the aft valve or rear VABI where a relatively large pressure differential exists across the valve. Since the best shield or liner used to contain the hot augmented gases is cooled by air from the bypass duct, the liner would be subjected to this high pressure differential. This is an unsatisfactory condition because high air pressure outside the liner would cause excessive stress. The liner would have to be structurally reinforced with an accompanying weight increase. In addition, the pressure differential would cause excessive cooling airflow through the liner resulting in a significant performance loss.

Another problem associated with engines employing thrust augmentation occurs during taxi operation of the aircraft when the engine is maintained at idle. Idle thrust of such engines is generally higher than desirable for easy aircraft handling during taxi conditions. In the variable cycle engine with a rear VABI, the injection of fan airflow through the engine exhaust nozzle is greatly diminished during taxi operations by closing the VABI valves which, to some extent, reduces engine thrust. However, much of the fan airflow is redirected through the heat shield or liner and eventually out the engine exhaust nozzle. Undesirable amounts of forward thrust are still produced by the variable cycle engine.

SUMMARY OF THE INVENTION

Therefore, it is an object of the present invention to provide a method and apparatus for preventing excessive pressure differential across an engine exhaust duct heat shield or liner downstream of the thrust augmentors.

It is another object of the present invention to provide a method and apparatus for controlling fan bypass airflow into a region surrounding the engine exhaust liner known as an exhaust duct cooling annulus.

In addition, it is an object of the present invention to reduce engine thrust during aircraft taxi operation.

These and other objects are accomplished in the present invention by providing a unique flow control at an inlet to the exhaust duct cooling annulus. This flow control is used to restrict bypass fan airflow into the cooling annulus during appropriate engine cycle operations. The flow control apparatus is comprised of an annular member or translating ring that interacts with an annular inlet into the exhaust nozzle liner to restrict incoming airflow. The flow control apparatus, in one form, is devised to be conveniently operated by an actuation system for a variable area bypass injecting and mixing device on a variable cycle engine thereby coordinating flow control operation with variable area bypass injection. This coordination can be accomplished by using a synchronizing ring in the actuation system as a dual functioning device that also provides the translating ring in the flow control apparatus.

DESCRIPTION OF THE DRAWINGS

FIG. 2 depicts a cross-sectional view of the present invention in an "open" position;

FIG. 3 depicts a cross-sectional view of the present invention in a "closed" position;

Referring now to FIG. 1, an advanced variable cycle engine 10 is shown comprising a fan section 11, a compressor 13, a combustor 14, and a turbine 15.

This engine employs multiple ducts to vary the relative amount of air directed through a bypass duct 12 rather than to the combustor 14 and turbine 15 under different operating conditions to improve engine performance. The engine's capability to vary this airflow permits the engine 10 to operate in a high bypass cycle at subsonic speeds and, conversely, operate in a low bypass cycle at supersonic speeds. Variation of the engine operating cycle in this manner greatly improves the engine's overall operating efficiency. A detailed description of one form of a variable cycle engine is shown in U.S. Pat. No. 4,068,471, issued Jan. 17, 1978, assigned to the same assignee as the present invention, and the disclosure of which is incorporated herein by reference.

Figure 4:
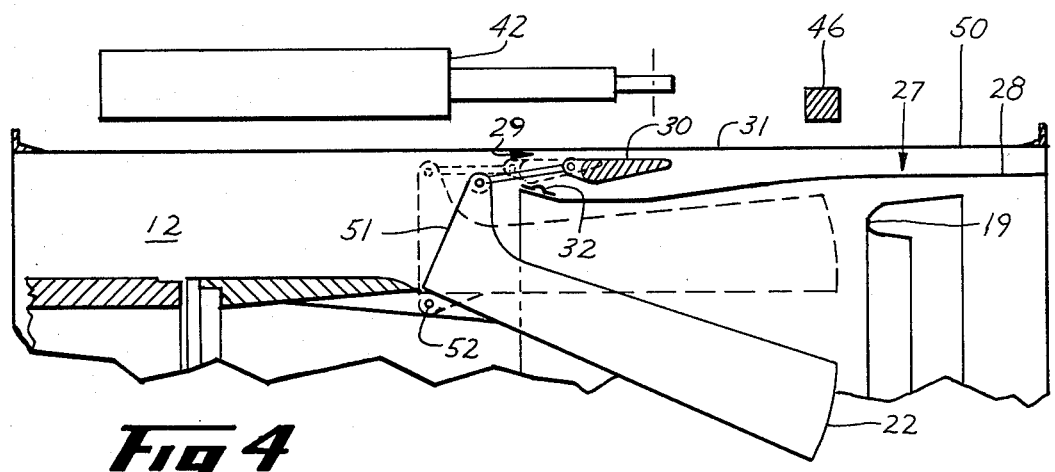
FIG. 4 depicts a cross-sectional view of the present invention in conjunction with a variable area bypass injector (VABI) actuation system.

In order to effectively vary the amount of air directed through bypass duct 12, two variable area bypass injectors (VABI's) 16 and 18 are provided: a first injector 16 at the forward end of the bypass duct 12, and the other injector 18 at the rear end or exit to the bypass duct. These two injectors 16 and 18 cooperate to direct the proper amount of air through duct 12 and additionally integrate that bypass flow with the core engine flow at the downstream end of duct 12 at a position upstream of afterburner 19, as shown in FIGS. 2, 3, and 4.

Figure 1:
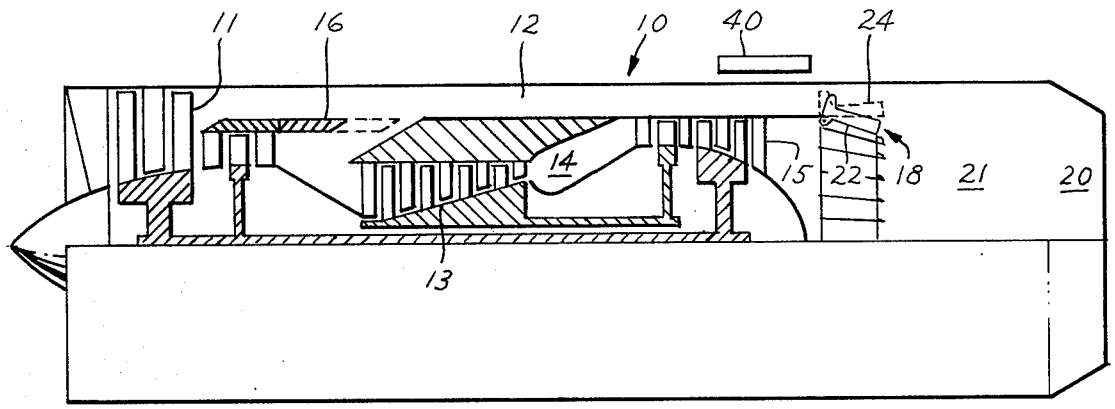
FIG. 1 depicts a cross-sectional view of an aircraft engine employing the present invention.

The rear VABI 18 is a multi-chute variable area mixer for directly mixing the bypass airflow with the core engine flow upstream of a conventional exhaust nozzle 20. In FIG. 1, one of the multiple chutes 22 of VABI 18 and its movement is illustrated to show its ability to mix airflow. When the chute 22 is in the solid line or "open" position of FIG. 1, which is the same position of the chute that is shown in FIG. 2, it will direct bypass airflow radially inward into the core engine flow from the turbine 12. When the chute 22 is pivoted radially outward to the dashed line or "closed" position 24 of FIG. 1, which is the position of the chute that is shown in FIG. 3, it almost completely closes the rear VABI and bypass airflow is essentially no longer mixed with core engine flow.

While the variable cycle engine, including the front and rear VABI, offers significant performance advantages, the special considerations discussed earlier have led to the present invention. Specifically, the changing cycles of engine operation, including the opening and closing of the rear VABI, cause a large variation in pressure between the bypass airflow and the core engine flow. This large pressure variation is primarily a function of the bypass airflow discharge area. When the chutes 22 are open, as shown in FIG. 2, a large portion of the bypass flow is mixed with core flow and there is little pressure difference between these two flows downstream of the rear VABI 18. When the chutes 22 are closed, very little mixing occurs, and the pressure difference dramatically increases. Referring now to FIGS. 2 and 3, the effect on airflow of the chutes is indicated by the relative size of the solid arrows, and the reason for the pressure differences can be readily appreciated. When the chutes 22 are open, as in FIG. 2, bypass airflow is directed into the core stream, as shown by arrow 26, and the pressure in an exhaust duct 21 radially inward of an exhaust duct coolant annulus 27, defined by coaxial surfaces of an inner cooling liner wall 28 and an outer wall 31, is relatively high. When the chutes 22 are closed, as in FIG. 3, the bypass flow is not directed radially inward; consequently, the pressure in the exhaust duct 21 drops, and a large pressure differential occurs across liner wall 28.

This large pressure differential across the cooling liner wall 28 can result in two extreme situations: (a) starving the liner wall 28 and nozzle 20 of cooling air with the chutes open, or (b) excessive cooling flow in annulus 27 and excessive pressure loading on liner wall 28 with the chutes closed.

In order to accommodate this pressure variation, while avoiding problems of liner wall overheating and overloading and to conserve coolant flow for performance reasons, the present invention comprises a variable area liner inlet valve. One embodiment of this invention is shown in FIGS. 2, 3, and 4. The inlet cross-sectional area of annulus 27 is defined by an annular gap between an annular, movable translating member such as actuation ring 30 and a sealing lip 32 at the forward end of the cooling liner wall 28. When the chutes 22 are open, as shown in FIG. 2, and there is relatively high pressure in the exhaust duct 21 radially inward of liner wall 28, the inlet area into the exhaust duct coolant annulus 27 is large as a result of translation of ring 30 toward duct 27 and away from lip 32. This causes high pressure in annulus 27 to compensate for high pressure in the exhaust duct and also provides adequate cooling flow. Conversely, when the chutes 22 are closed, as shown in FIG. 3, and the pressure inside the exhaust duct 21 is relatively low, the inlet cross-sectional area is reduced, thereby preventing excessive cooling flow and limited liner pressure loading. Thus, there is provided valve apparatus for controlling and coordinating pressures between coolant duct 27 and exhaust duct 21.

A desirable feature of this liner inlet valve is that when it is incorporated into a variable cycle engine of the type shown in FIG. 1, the valve function is provided by an actuation system 40 for the rear VABI 18 without adding any additional parts to VABI 18. As shown in FIG. 4, the valve action caused by the actuation system takes place between the actuation ring 30 and the lip 32. This actuation ring 30 provides a dual function of accomplishing a valve action and simultaneously pivoting the rear VABI chutes 22. Thus, according to the present invention, effective valve action is provided at the liner inlet 29 by properly contouring coaxial inner and outer surfaces, the actuation ring 30, and the lip 32, for minimum pressure loss in the valve. The specially contoured actuation ring 30 has an outer surface generally contiguous to wall 31 and an inner surface formed to provide a protuberance or bulbous leading edge. FIGS. 2, 3, and 4, show how ring 30 moves relative to the lip 32 of the liner 28 as the mixer chutes 22 are moved between open and closed positions.

In addition, these functions are coordinated with afterburner operation during which the chutes 22 are opened to mix bypass airflow with the core stream upstream of the flameholder 19. When the afterburner is operated, greater liner cooling airflow is provided to cool the liner 28 while it is subjected to the high temperature resulting from combustion inside the nozzle duct 21.

Figure 5:
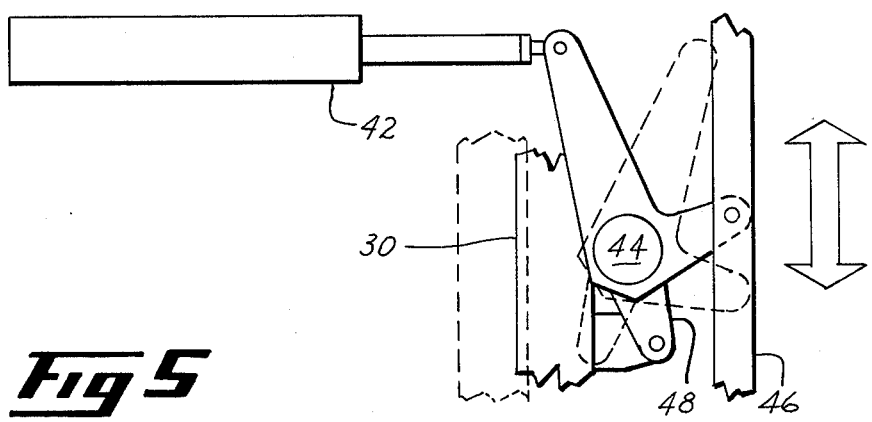
FIG. 5 depicts an elevation view of a variable area bypass injector (VABI) actuation system for use in conjunction with the present invention.

The actuation system 40 is the subject of the previously cross-referenced patent application entitled, "Actuation System for Use On a Gas Turbine Engine." For the purpose of explaining the relationship between components of the actuation system 40 and movement of the inlet flow valve, a brief description of this actuation system follows. The major components of one section of the actuation system 40 are shown in FIG. 5, including a hydraulic actuator 42, a crankshaft 44, an outer synchronizing ring 46, and the actuation ring 30. In the embodiment of the actuation system 40, used on the rear VABI, the actuation ring 30 is translated forward and aft by a pivoting of arms 48, one each extending from each of three partially rotating crankshafts 44. The crankshafts are mounted on an augmentor casing 50, shown in FIG. 4, and transmit an actuating force of the actuators 42 through the casing wall to the actuation ring 30 and the inlet valve. The initial actuating force is accomplished by three or more actuators 42. The motion of these actuators is synchronized by means of the circumferential motion of the synchronizing ring or yoke 46 that interconnects all the crankshafts 44, as shown.

The connecting elements between the actuation system 40 and the chutes 22 and their relationship to the inlet valve are shown in FIG. 4. Inside the augmentor casing 50, the actuation ring 30 is linked to upper extensions 51 of each of approximately twenty chutes 22 that are symmetrically distributed around the aft end of the bypass duct 12. The chutes 22 are pivotally mounted about pivots 52 so that translation of the actuation ring 30 along with the upper extension 51 causes the chutes to pivot radially in and out of the core engine flowpath. These connecting elements enable the action of the rear VABI to be coordinated with the valve function of the inlet valve in the manner discussed previously. Complete details of the apparatus and method of this actuation system are available in the previously cross-referenced and concurrently filed patent application.

A unique function of the inlet valve in combination with the rear VABI is an ability to significantly reduce thrust of the engine during aircraft taxi operations. This is accomplished by closing the rear VABI chutes which simultaneously closes the inlet valve to reduce the area of the liner inlet 29. When both the chutes 22 and the inlet valve are "closed" the fan air flowing through the bypass duct 12 is effectively blocked at the exit of the duct 12 thereby eliminating the major portion of the forward thrust created by the bypass airflow. This method of reducing thrust during taxi operations reduces the amount of braking necessary and enhances the handling of aircraft at taxi speeds.

While specific embodiments of the present invention have been described, it will be apparent to those skilled in the art that various modifications thereto can be made without departing from the scope of the invention as recited in the appended claims.

Having described the invention, what is claimed as novel and desired to be secured by Letters Patent of the United States is:

1. In a gas turbofan engine, with a variable area bypass injector comprising pivotally mounted chutes for injecting bypass airflow radially inward into an exhaust duct of the aircraft engine when said chutes are pivoted radially inward, an apparatus for controlling fan bypass duct airflow into an exhaust duct cooling annulus that is downstream and in direct flow communication with a bypass duct, wherein said apparatus comprises:
   inner and outer coaxial surfaces defining therebetween an annular inlet to said exhaust duct cooling annulus;
   a sealing lip on one of said coaxial surfaces, said lip extending into said annular inlet; and
   an annular translating member movable into and out of said annular inlet at the region of said sealing lip thereby providing a flow control for at least partially blocking airflow into said exhaust duct cooling annulus;
   link arms extending from said annular translating member and pivotally connected to said chutes whereby translation of said translating member for restricting airflow into the annular inlet additionally pivots said chutes radially outward to restrict injection of bypass air into the exhaust duct.

2. The apparatus recited in claim 1, wherein:
   said sealing lip is fixed to said inner coaxial surface; and
   said annular translating member is comprised of a band having a protuberance for interacting with said sealing lip to restrict airflow into said inlet after appropriate translation of said annular translating member.

3. The apparatus recited in claim 2, wherein said band comprises:
   an outer surface being generally contiguous to said outer coaxial surface and an inner side formed to provide a bulbous leading edge for interacting with said sealing lip to restrict airflow.

* * * * *